(12) United States Patent
Nordmeyer

(10) Patent No.: US 7,490,817 B2
(45) Date of Patent: *Feb. 17, 2009

(54) DISTANCE INDICATING SYSTEM AND METHOD

(75) Inventor: Daniel L. Nordmeyer, Indianapolis, IN (US)

(73) Assignee: BFS Diversified Products LLC, Indianapolis, IN (US)

( * ) Notice: Subject to any disclaimer, the term of this patent is extended or adjusted under 35 U.S.C. 154(b) by 221 days.

This patent is subject to a terminal disclaimer.

(21) Appl. No.: 11/028,851

(22) Filed: Jan. 4, 2005

(65) Prior Publication Data

US 2006/0157900 A1 Jul. 20, 2006

(51) Int. Cl.
*F16F 9/04* (2006.01)

(52) U.S. Cl. ............... 267/64.27; 340/10.1; 340/572.1

(58) Field of Classification Search ............... 92/5 R; 91/1; 73/865.9; 324/635; 342/118, 128, 342/134, 125; 340/10.1, 572.1, 10.31; 267/64.11–64.28
See application file for complete search history.

(56) References Cited

U.S. PATENT DOCUMENTS

| | | | | |
|---|---|---|---|---|
| 3,780,370 A | * | 12/1973 | Reeves | 342/61 |
| 3,859,624 A | * | 1/1975 | Kriofsky et al. | 340/941 |
| 4,041,490 A | | 8/1977 | Watt et al. | |
| 4,068,951 A | * | 1/1978 | Froome et al. | 356/5.1 |
| 4,072,946 A | * | 2/1978 | Kneefel | 342/42 |
| 4,183,022 A | * | 1/1980 | Baudard et al. | 342/174 |
| 4,278,977 A | | 7/1981 | Nossen | |
| 4,307,397 A | * | 12/1981 | Holscher | 342/125 |
| 4,621,705 A | * | 11/1986 | Etoh | 180/169 |
| 4,646,092 A | * | 2/1987 | Schreuder | 342/125 |
| 4,737,705 A | * | 4/1988 | Bitar et al. | 324/635 |
| 4,739,328 A | | 4/1988 | Koelle et al. | |
| 4,757,315 A | * | 7/1988 | Lichtenberg et al. | 342/125 |
| 4,798,369 A | | 1/1989 | Geno et al. | |
| 4,804,961 A | * | 2/1989 | Hane | 342/125 |
| 4,812,842 A | | 3/1989 | Bayerlein et al. | |
| 4,817,922 A | | 4/1989 | Hovance | |
| 5,229,829 A | | 7/1993 | Nihei et al. | |
| 5,285,189 A | | 2/1994 | Nowicki et al. | |
| 5,298,904 A | | 3/1994 | Olich | |

(Continued)

FOREIGN PATENT DOCUMENTS

DE 34 23 602 A1 1/1986

(Continued)

OTHER PUBLICATIONS

Lee and Sorrells, "Passive RFID Basics," Microchip Technology Inc., 2001, pp. 1-8.

(Continued)

*Primary Examiner*—Robert A Siconolfi
*Assistant Examiner*—Vu Q Nguyen
(74) *Attorney, Agent, or Firm*—Sarah M. Jabbari; Fay Sharpe LLP

(57) ABSTRACT

A distance indicating system includes a transceiver broadcasting an electromagnetic wave and a transponder spaced a distance from the transceiver that receives the electromagnetic wave. The transponder is adapted to induce a modulation of the electromagnetic wave in relation to the distance between the transceiver and the transponder. A method is also disclosed.

18 Claims, 11 Drawing Sheets

U.S. PATENT DOCUMENTS

| | | | |
|---|---|---|---|
| 5,337,137 A | 8/1994 | Ogawa et al. | |
| 5,373,445 A | 12/1994 | Yopp | |
| 5,500,065 A | 3/1996 | Koch et al. | |
| 5,521,497 A | 5/1996 | Schneider et al. | |
| 5,548,291 A | 8/1996 | Meier et al. | |
| 5,550,536 A * | 8/1996 | Flaxl | 340/10.3 |
| 5,552,789 A | 9/1996 | Schuermann | |
| 5,559,507 A | 9/1996 | Beigel | |
| 5,570,086 A | 10/1996 | Hanaoka et al. | |
| 5,589,821 A * | 12/1996 | Sallen et al. | 340/573.4 |
| 5,594,448 A | 1/1997 | d'Hont | |
| 5,619,207 A | 4/1997 | d'Hont | |
| 5,701,121 A | 12/1997 | Murdoch | |
| 5,707,045 A | 1/1998 | Easter | |
| 5,731,754 A | 3/1998 | Lee, Jr. et al. | |
| 5,801,372 A * | 9/1998 | Yamaguchi | 235/492 |
| 5,859,692 A | 1/1999 | Ross, Jr. et al. | |
| 5,936,161 A | 8/1999 | Fischer | |
| 6,036,179 A | 3/2000 | Rensel | |
| 6,073,491 A | 6/2000 | Fischer et al. | |
| 6,122,329 A | 9/2000 | Zai et al. | |
| 6,249,673 B1 * | 6/2001 | Tsui | 455/92 |
| 6,309,494 B1 | 10/2001 | Koch et al. | |
| 6,356,738 B1 * | 3/2002 | Schneider et al. | 455/41.2 |
| 6,414,626 B1 | 7/2002 | Greef et al. | |
| 6,469,590 B1 * | 10/2002 | Lewis et al. | 333/17.3 |
| 6,473,028 B1 * | 10/2002 | Luc | 342/118 |
| 6,474,380 B1 | 11/2002 | Rensel et al. | |
| 6,614,239 B2 * | 9/2003 | Borghi | 324/644 |
| 6,621,278 B2 * | 9/2003 | Ariav | 324/637 |
| 6,637,269 B2 | 10/2003 | Reck et al. | |
| 6,731,199 B1 * | 5/2004 | Ueda | 340/10.4 |
| 6,765,393 B2 * | 7/2004 | Pierenkemper et al. | 324/635 |
| 6,931,930 B2 | 8/2005 | Reck | |
| 6,963,301 B2 * | 11/2005 | Schantz et al. | 342/125 |
| 7,119,736 B2 * | 10/2006 | Heide et al. | 342/125 |
| 2002/0088517 A1 | 7/2002 | Shimura | |
| 2002/0180172 A1 | 12/2002 | Gottschalk et al. | |
| 2003/0090365 A1 * | 5/2003 | Bergerhoff | 340/5.61 |
| 2003/0150920 A1 | 8/2003 | Parks | |
| 2004/0118517 A1 | 6/2004 | Buist et al. | |
| 2004/0130442 A1 | 7/2004 | Breed et al. | |
| 2004/0203470 A1 | 10/2004 | Berliner et al. | |
| 2004/0257220 A1 | 12/2004 | Fischer et al. | |
| 2005/0253697 A1 | 11/2005 | Taguchi | |
| 2007/0013544 A1 | 1/2007 | Chiu | |

FOREIGN PATENT DOCUMENTS

| | | |
|---|---|---|
| DE | 197 01 530 C1 | 8/1998 |
| EP | 1 522 431 A | 4/2005 |
| FR | 2 574 188 A1 | 6/1986 |
| GB | 2 177 475 A | 1/1987 |
| JP | 07 181254 A | 7/1995 |
| WO | WO 99/40704 A | 8/1999 |
| WO | WO 99/61936 A | 12/1999 |
| WO | WO 01/84518 A | 11/2001 |
| WO | WO 02/29435 A | 4/2002 |
| WO | WO 2006/073717 A | 7/2006 |

OTHER PUBLICATIONS

International Search Report; PCT/US2007/001532; dated Jun. 12, 2007; mailed Jun. 19, 2007.

International Search Report for PCT/US2007/010063; Authorized Officer Cristina Novelli, Mailing Date Jun. 26, 2008, 6 pages.

* cited by examiner

DISTANCE INDICATING SYSTEM AND METHOD

BACKGROUND

The present novel concept broadly relates to the art of distance measurement and, more particularly, to a system and method for indicating the distance between associated structural members using electromagnetic carrier wave modulation.

The subject system and method are amenable to broad use in a wide variety of applications and environments. One example of a suitable application is the use of the subject system and method on and with an associated fluid suspension member, such as an air spring of a vehicle, for example. The subject system and method will be discussed in detail hereinafter with specific reference to use on such an associated fluid suspension member. However, it is to be specifically understood that the subject system and method are capable of broader application and are not intended to be limited to this specific example of a suitable application.

A variety of well known and commonly used devices and arrangements have been and are currently used to monitor the relative position of one structural member to another. For example, mechanical linkage sensors that include one or more linkage members are often used to connect between adjacent structural members, such as a suspension component of a vehicle and the corresponding frame or body of the same. The linkage members typically act through a variable resistor or other suitable component that changes in response to the movement of the linkage. An electronic control unit (ECU) or other suitable device then determines the relative position of one structural member to the other based upon a corresponding change in voltage across the variable resistor or a corresponding change in current through the resistor.

Unfortunately, such arrangements have a number of problems and/or disadvantages that are commonly associated with their continued use. One problem with the use of mechanical linkages, particularly those used in association with the suspension system of a vehicle, is that the linkages are frequently subjected to physical impacts, such as may be caused by debris from a roadway, for example. This can result in the linkage being significantly damaged or broken, such that the device no longer operates properly, if it operates at all.

Another problem with mechanical linkage sensors is that the electronic components thereof are typically exposed to harsh environmental conditions (e.g., temperature extremes, water, dirt, salt) normally experienced by a vehicle traveling along a roadway. As a result of such exposure, the electronic components of the sensors can become corroded and fail to function properly. Due to one or both of these or other problems, one or more of the mechanical linkage sensors may be non-operational at any given time. Thus, regular inspection and replacement of such sensors is typically required.

Still another disadvantage of mechanical linkage sensors is that the same are mounted separately from the other suspension components. As a result, additional time and effort is typically spent installing these components during the assembly process. Furthermore, additional effort is typically involved in creating a clearance area for mounting and operation of the mechanical linkage. Thus, such sensors disadvantageously require a significant amount of effort and space for mounting and operation.

As an alternative to mechanical linkage sensors, non-contact sensors that utilize sound or pressure waves traveling through a fluid medium, typically at an ultrasonic frequency, have been used in determining the relative position of one structural member to another. One example of such an application includes an ultrasonic sensor being used to determine a height of a fluid suspension member, such as an air spring. In such a use, the ultrasonic sensor is supported on one end member of the air spring and sends ultrasonic waves through the spring chamber of the air spring toward the opposing end member. The waves are reflected back by a suitable feature of the opposing end member and the distance therebetween is determined in a conventional manner.

One advantage of such an arrangement over mechanical linkages is that the ultrasonic sensor is at least partially sheltered from impacts and exposure. However, numerous disadvantages also exist with the use of ultrasonic sensors. One such disadvantage is that such sensors are relatively expensive which tends to undesirably increase production costs. Also, the replacement cost of a sensor that does get damaged by an impact or from exposure is likewise increased.

Another disadvantage is that ultrasonic sensors require a target that is suitable to reflect the ultrasonic waves back to the sensor for determining the distance therebetween. If such a target is not provided, the ultrasonic waves will not be reflected back properly and, thus, a correct determination of distance will not be possible. Thus, a target area must be provided for the proper operation of ultrasonic sensors. This can be particularly problematic, however, where the design constraints of a product limit the possibilities for including a target area. This is also a problem for existing products are being outfitted with ultrasonic sensors, where the existing products do not have a suitable target area.

BRIEF DESCRIPTION

A distance indicating system in accordance with the present novel concept is provided that includes a transceiver broadcasting an electromagnetic wave and a transponder spaced a distance from the transceiver. The transponder causes a modulation of the wave in relation to the distance.

A distance indicating system in accordance with the present novel concept for an associated air spring used on an associated vehicle is provided. The associated air spring includes first and second support members secured together by an elastomeric wall such that the support members move relative to one another in response to a load applied to the associated air spring. The distance indicating system includes a transceiver for broadcasting an electromagnetic carrier wave. The system also includes a transponder spaced a distance from the transceiver and causing a modulation of the wave in relation to the distance. One of said transceiver and said transponder is supported on one of the first and second support members.

An air spring assembly in accordance with the present novel concept is provided that includes an upper end member and a lower end member in spaced relation to the upper end member. A flexible spring member is supported between the upper and lower end members. A transceiver is supported on one of the upper and lower end members and broadcasts an electromagnetic carrier wave. A transponder is supported on the other of the upper end member and the lower end member and is adapted to cause a modulation of the carrier wave in relation to a distance between the transceiver and the transponder.

A method of determining a distance between first and second structural members in accordance with the present novel concept is provided that includes steps of providing a transceiver supported on the first structural member and providing a transponder supported on the second structural member. Other steps include broadcasting an electromagnetic wave and causing a modulation of the wave in relation to a distance between the transceiver and the transponder. Further steps include detecting a magnitude of the modulation of the wave and determining the distance between the transceiver and the transponder.

DETAILED DESCRIPTION

Figure 1:
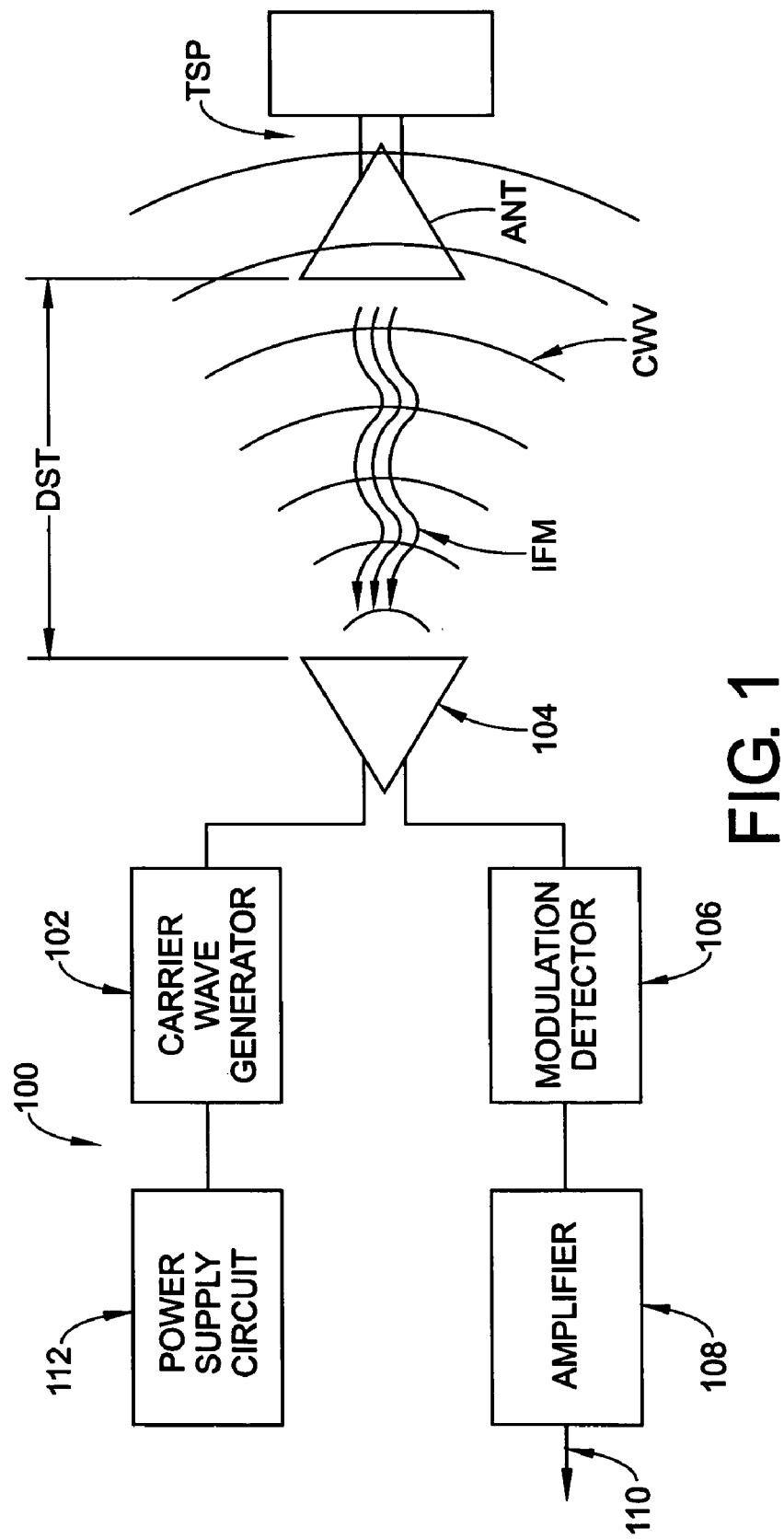
FIG. 1 schematically illustrates one embodiment of a transceiver in accordance with the present novel concept.

Referring now in greater detail to the drawings wherein the showings are for the purposes of illustrating preferred embodiments of the present novel system, apparatus and/or method only, and not for the purposes of limiting the same, FIG. 1 schematically illustrates a transceiver 100 in use with a transponder TSP that is spaced a distance DST from the transceiver. It will be appreciated that transponder TSP is merely representative of a suitable transponder cooperable with a transceiver, such as transceiver 100, and that the structure and operation of exemplary embodiments of suitable transponders will be discussed with more specificity hereinafter. Transceiver 100 is operable to broadcast an electromagnetic signal, such as an electromagnetic carrier wave CWV, for example, toward transponder TSP.

Transceiver 100 includes a carrier wave generator 102 in electrical communication with an antenna 104. Wave generator 102 is adapted to output an electrical carrier wave signal to antenna 104, which in turn is adapted to broadcast an electromagnetic carrier wave, such as wave CWV, for example, corresponding to the carrier wave signal output by wave generator 102. A modulation detector 106 is also in electrical communication with antenna 104 and is adapted to detect a modulation of an electrical characteristic across or along the antenna. The modulation detector outputs an electrical signal, such as a voltage or current, for example, in corresponding relation to a magnitude of the modulation across or along the antenna. In FIG. 1, modulation detector 106 outputs an analog signal that can be amplified by an optional amplifier 108 prior to being communicated, as indicated generally by arrow 110, to another electronic device, circuit or system, such as an electronic control unit (not shown), for example.

A power supply circuit 112 is also shown in FIG. 1. The power supply circuit can be formed as a part of a fully integrated circuit of transceiver 100, a separate circuit supported on transceiver 100 or as a separate circuit on an entirely separate component from transceiver 100. In one preferred embodiment, shown in FIG. 1, power supply circuit 112 is formed as a portion of a fully integrated circuit of the transceiver. Regardless of the construction, however, power supply circuit 112 is adapted to provide suitably conditioned and regulated electrical power from a power source (not shown) to the components of transceiver 100. These components can include, without limitation, wave generator 102 to which power supply circuit 112 is shown in FIG. 1 as being in direct electrical connection. It will be appreciated that the power source (not shown) can be any suitable AC or DC power source, such as a battery (vehicle or other), a generator or alternator, an electronic control unit or a power control module, for example.

In general, antenna 104 of transceiver 100 broadcasts or otherwise outputs an electromagnetic signal, such as carrier wave CVW, for example, as discussed above. An antenna ANT of transponder TSP receives the carrier wave, which has one or more properties or characteristics that vary with distance, as will be understood by those of ordinary skill in the art. The transponder is operative to induce or otherwise cause a modulation of the carrier wave in relation to the distance between the transceiver and the transponder. In one example of such an operation, it will be recognized by the skilled artisan that antennae 104 and ANT act as the windings of a loosely coupled transformer when under the influence of carrier wave CWV. As such, a momentary change in an electrical characteristic or property of one antenna will induce or otherwise cause a corresponding change or modulation along or across the other antenna. This modulation can be used to determine distance DST between the transceiver and transponder, or alternately to communicate data therebetween, as will be discussed in detail hereinafter.

Figure 2:
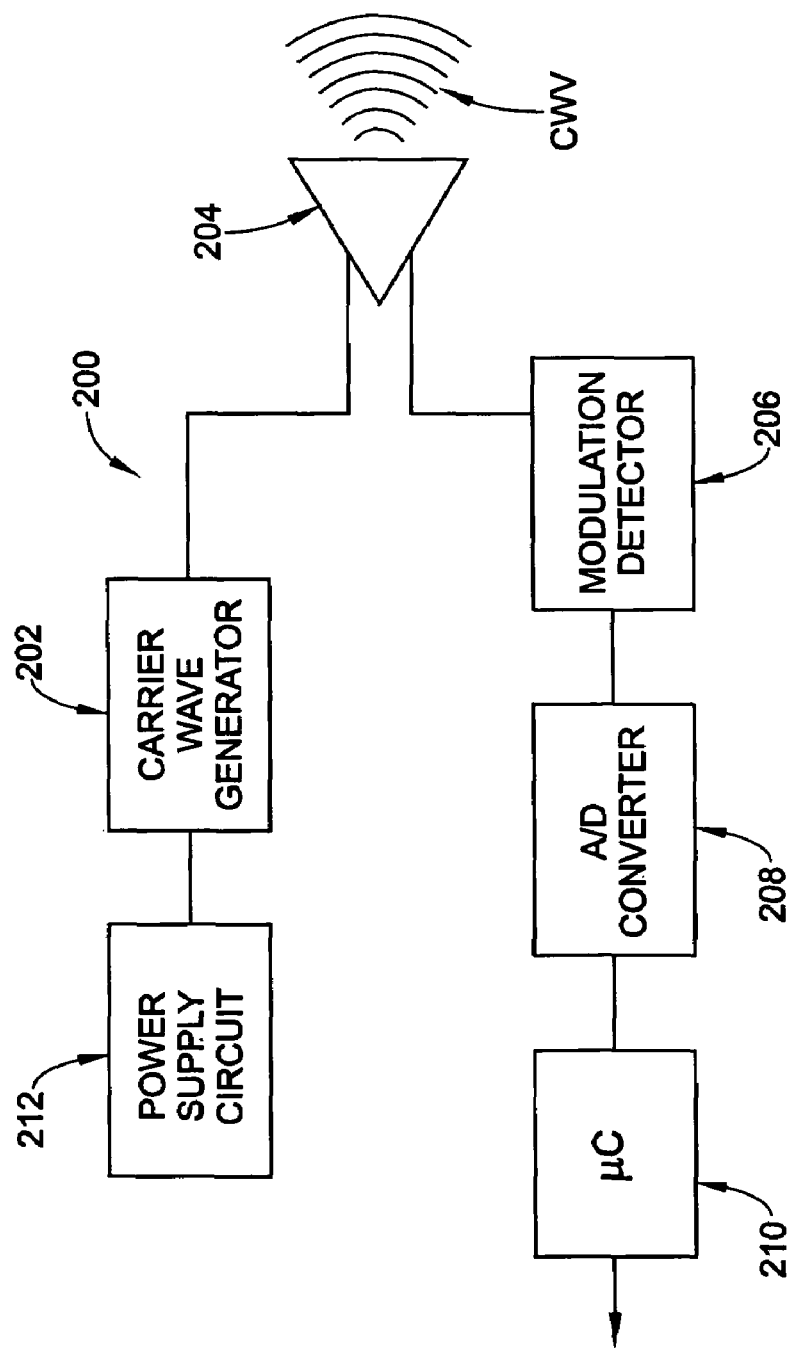
FIG. 2 schematically illustrates an alternate embodiment of the transceiver shown in FIG. 1.

An alternate embodiment of a transceiver 200 is shown in FIG. 2, and includes a carrier wave generator 202 in electrical communication with an antenna 204. Carrier wave generator 202 is adapted to output an electrical carrier wave signal to antenna 204, which receives the carrier wave signal from the wave generator and is adapted to broadcast an electromagnetic carrier wave, such as wave CWV, for example, corresponding to the carrier wave signal output by wave generator 202.

A modulation detector 206 is also in electrical communication with antenna 204 and is adapted to detect a modulation of an electrical characteristic across or along the antenna. Modulation detector 206 outputs an analog signal in corresponding relation to a magnitude of the modulation across or along antenna 204. Rather than amplifying the analog output as in transceiver 100, however, transceiver 200 includes an analog-to-digital (A/D) converter 208 that is in electrical communication with the modulation detector. The A/D converter receives the analog signal from modulation detector 206 and converts the same into a digital data stream. The data stream from converter 208 can then be communicated in a typical manner to a device, such as a microcontroller 210, for example, or another component or system. It will be appreciated that such a device or other system, including microcontroller 210 can either be integral with transceiver 200 or a part of another, separate system. For example, such a processor can communicate with or be a component of a vehicle data bus, such as a CAN bus, SAE J1850 data bus, or other vehicle information system, for example.

A power supply circuit 212 is shown in FIG. 2. It will be appreciated, however, that power supply circuit 212 can be provided in any one of various implementations and/or configurations, as discussed above, to provide suitably conditioned and regulated power to circuit 200.

Carrier wave generators 102 and 202 are adapted to output an electrical carrier wave signal suitable for broadcast as an electromagnetic carrier wave by the associated antenna. In one preferred embodiment, the electrical carrier wave signal output by generators 102 and 202 is a sine wave having a substantially constant amplitude and frequency, though it is to be distinctly understood that any suitable electrical carrier wave signal can be used. It will be appreciated that the electrical signal output by the generators can have any suitable voltage, such as from about 50 volts to about 100 volts, for example, and can have any suitable frequency, such as from about 100 kHz to about 30 MHz, for example. In one exemplary embodiment, the electrical signal has a frequency of about 125 kHz and an amplitude of about 100 volts, though such values can vary from application to application, as mentioned above.

Figure 3:
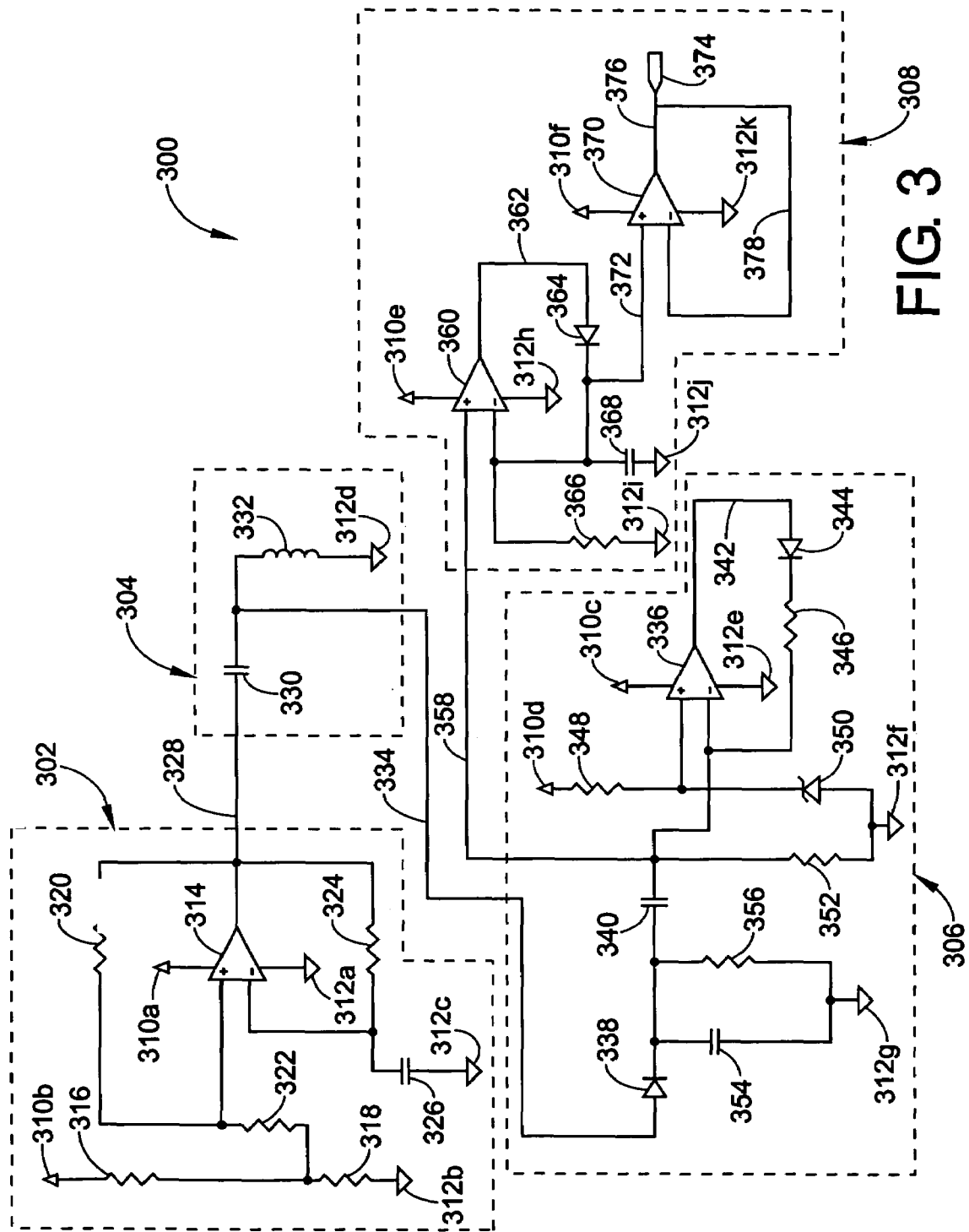
FIG. 3 is a diagram of one embodiment of an electronic circuit operable as the transceiver in FIG. 1.

A diagram of one embodiment of a suitable electronic circuit 300 operable as a transceiver, such as transceiver 100, for example, is shown in FIG. 3 and includes a carrier wave generator circuit 302, an antenna circuit 304, a modulation detector circuit 306 and an amplifier circuit 308. It will be appreciated that circuit 302 generally corresponds to generators 102 and 202 shown in FIGS. 1 and 2, and that circuits 304, 306 and 308 similarly correspond to antennae 104 and 204, modulation detectors 106 and 206 and amplifier 108, respectively. It will be additionally appreciated that A/D converter 208 and microcontroller 210 are of a typical construction well known to the skilled artisan and that one of ordinary skill in the art could electrically connect A/D converter 208 to modulation detector 206 even though no schematic illustration thereof is provided. It will be further appreciated that no power supply circuit corresponding to power supply 112 and 212 is provided in circuit 300. It is to be understood, however, that circuit 300 could alternately include a power supply circuit, even when the primary power supply includes the attendant conditioning and regulating circuitry, to ensure that the incoming electrical power is conditioned and regulated as desired. Furthermore, it will be recognized by the skilled artisan that circuit 300 can be formed as an integrated circuit on a unitary substrate, such as onj a silicon wafer, for example, or alternately can be formed from discrete components in any suitable manner of implementation and/or using any suitable circuit fabrication techniques.

As shown in FIG. 3, circuit 300 includes a variety to traditional electrical components, including, without limitation, resistors, capacitors, diodes, operational amps, and inductors. It will be appreciated that these components are of substantially standard construction and are commonly available, unless otherwise noted. Additionally, various portions of circuit 300 connect to a positive terminal of a power supply (not shown) or power supply circuit (not shown) at one or more common points. The portions of circuit 300 that are so connected are generally indicated throughout the circuit diagram by terminal arrows 310. Similarly, various portions of the circuit are connected to a common ground, and these portions are shown generally by terminal arrows 312.

As mentioned above, circuit 300 includes a plurality of operational amplifiers (op-amps). It will be well understood by the skilled artisan that the op-amps are represented schematically in FIG. 3 using a symbol having a traditional pin configuration. Even though the pins are not individually identified by an item number, each op-amp includes opposing supply voltage pins (SV pins), a positive input pin (PI pin), a negative input pin (NI pin) and an output pin (TO pin). One example of a suitable op-amp is available from Texas Instruments of Dallas, Tex. as part number LM248.

Wave generation circuit 302 includes an op-amp 314, resistors 316-324 and a capacitor 326. Op-amp 314 has SV pins connected at terminal arrows 310a and 312a. The TO pin is connected to a voltage divider formed between terminal arrows 310b and 312b by resistors 316 and 318. The TO pin is connected to the voltage divider through resistors 320 and 322 and forms a feedback loop due to the PI pin of op-amp 314 being connected between resistors 320 and 322. Additionally, the TO pin of the op-amp is connected to ground at terminal arrow 312c through resistor 324 and capacitor 326. A feedback loop is formed with the TO pin due to the connection of the NI pin of the op-amp between resistor 324 and capacitor 326.

An electrical carrier wave signal is output by the TO pin of op-amp 314 and communicated to antenna circuit 304 along lead 328. Antenna circuit 304 includes a capacitor 330 that is in electrical communication with ground at terminal arrow 312d through an inductor 332. The inductor is represented in FIG. 3 by a standard symbol. However, it is to be appreciated that tuning or optimizing of the antenna may be desirable and, in such situations, the inductor can be formed into a specific shape or arrangement, such as a square shape, for example. In one exemplary embodiment, inductor 332 is a coil of wire that is formed into a circular or loop shape.

Modulation detecting circuit 306 is in electrical communication with antenna circuit 304 through lead 334 that is connected between capacitor 330 and inductor 332. Lead 334 is in electrical communication with the NI pin of an op-amp 336 through a diode 338 and a capacitor 340. Op-amp 336 has SV pins connected at terminal arrows 310c and 312e. A feedback loop is formed between the TO and NI pins of op-amp 336 by a lead 342 connected through a diode 344 and a resistor 346. The PI pin of op-amp 336 is connected between terminal arrows 310d and 312f through resistor 348 and diode 350, respectively. Diode 350 is shown in FIG. 3 as being a zener diode. Additionally, terminal arrow 312f is connected to the NI pin of op-amp 336 via lead 334 through a resistor 352. Terminal arrow 312g is connected along lead 334 separately through each of capacitor 354 and resistor 356.

Amplifier circuit 308 is electrically connected to modulation detecting circuit 306 by lead 358. Amplifier circuit 308 includes a first op-amp 360, and lead 358 connects to the PI pin thereof from along lead 334 between the NI pin of op-amp 336 and capacitor 340. Op-amp 360 has SV pins connected at terminal arrows 310e and 312h. A feedback loop is formed by lead 362 connected between the TO and NI pins of op-amp 360. A diode 364 is connected along lead 362, and the NI pin of op-amp 360 is also connected to terminal arrow 312i through resistor 366 and to terminal arrow 312j through capacitor 368. The PI pin of a second op-amp 370 is connected to lead 362 between diode 364 and the NI pin of op-amp 360 through a lead 372. An output connector 374 is connected to the TO pin of op-amp 370 by an output lead 376. A feedback loop is formed using a lead 378 connecting between the NI pin and lead 376 from between the TO pin and output connector 374. It will be appreciated that output connector 374 generally acts as an interface for communications arrow 110 shown in FIG. 1. As such, connector 374 can be of any suitable type, kind and/or configuration.

Figure 4:
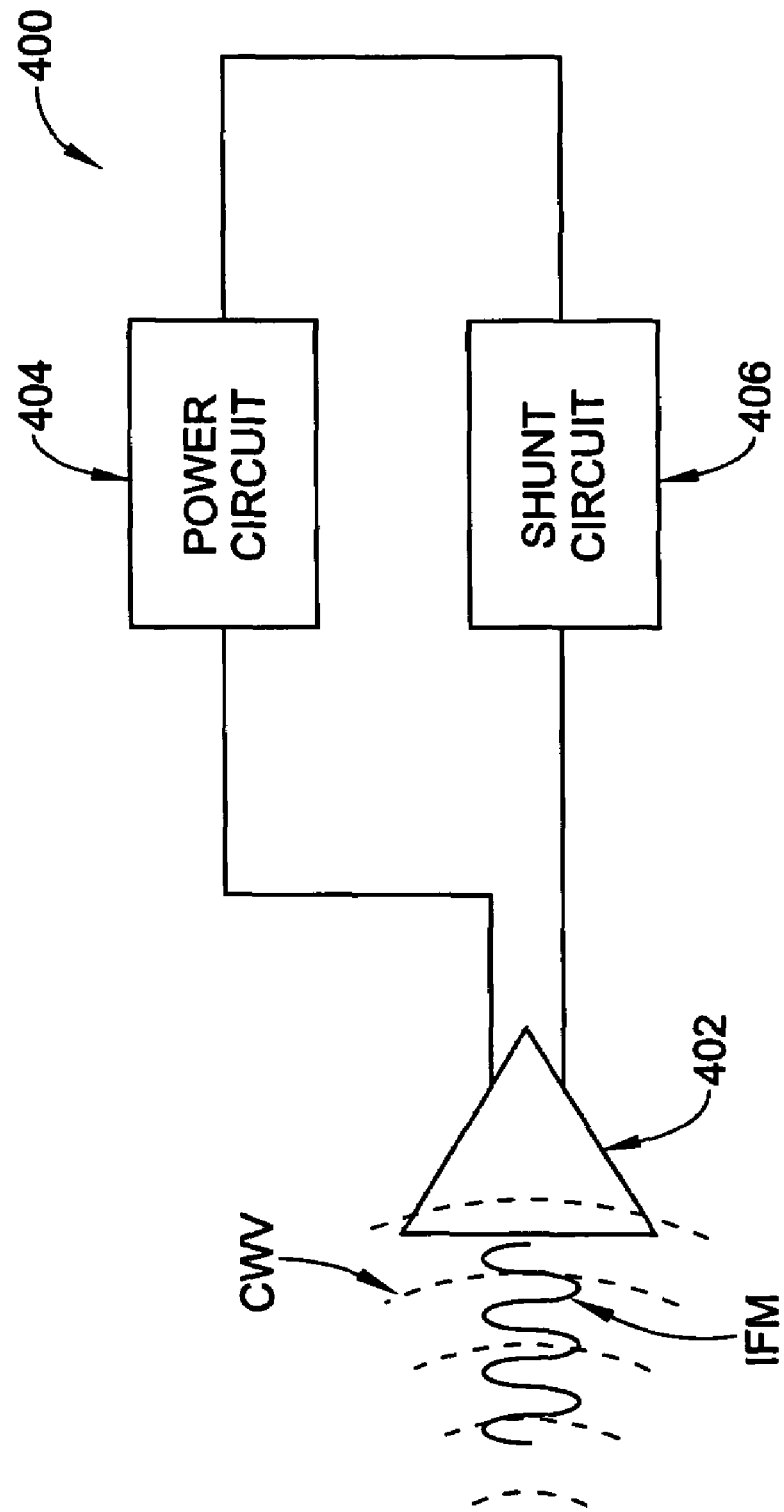
FIG. 4 schematically illustrates one embodiment of a transponder in accordance with the present novel concept.

A transponder 400 is shown in FIG. 4 and includes an antenna 402, a power circuit 404 and a shunt circuit 406. Generally, transponder 400 will be spaced a distance from one of either transceiver 100 or 200 and operate in conjunction therewith. More specifically, antenna 402 is adapted to receive electromagnetic carrier wave CWV broadcast by the antenna of the transceiver. The electromagnetic carrier wave induces an electrical output across or along the antenna. This electrical output is communicated to power circuit 404, which collects the electrical output and periodically energizes shunt circuit 406. When energized, the shunt circuit shorts antenna 402. This causes a change in the electromagnetic properties of antenna 402, such as substantially reducing the inductance of the antenna, for example. The change in the electromagnetic properties of antenna 402 induces a corresponding change across or along the antenna of the corresponding transceiver, such as transceiver 100 or 200, for example. It is this change across or along the antenna of the corresponding transceiver that is detected by the associated modulation detector of the transceiver, such as modulation detector 106 or 206, for example.

In one exemplary embodiment, antenna 402 of transponder 400 includes an inductive element (not shown). It is across or along this inductive element that the electromagnetic carrier wave induces the electrical output which is transmitted to power circuit 404. The electrical output, which includes an electrical potential and/or an electrical current, accumulates within power circuit 404 which, in turn, transmits an electrical energy pulse to shunt circuit 406 once a certain, predetermined quantity of electrical energy has accumulated within the power circuit. The electrical energy pulse causes shunt circuit 406 to form an electrical short across the inductive element of antenna 402. The short across the inductive element reduces the inductance thereof to about zero. One skilled in the art will recognize that this will cause a corresponding change along or across the inductive element of the antenna in the associated transceiver, as the two elements act as a loosely coupled transformer. It is this corresponding change that is monitored by the modulation detector. Such an induced field modulation is indicated generally by sine wave IFM in FIG. 4.

Figure 5:
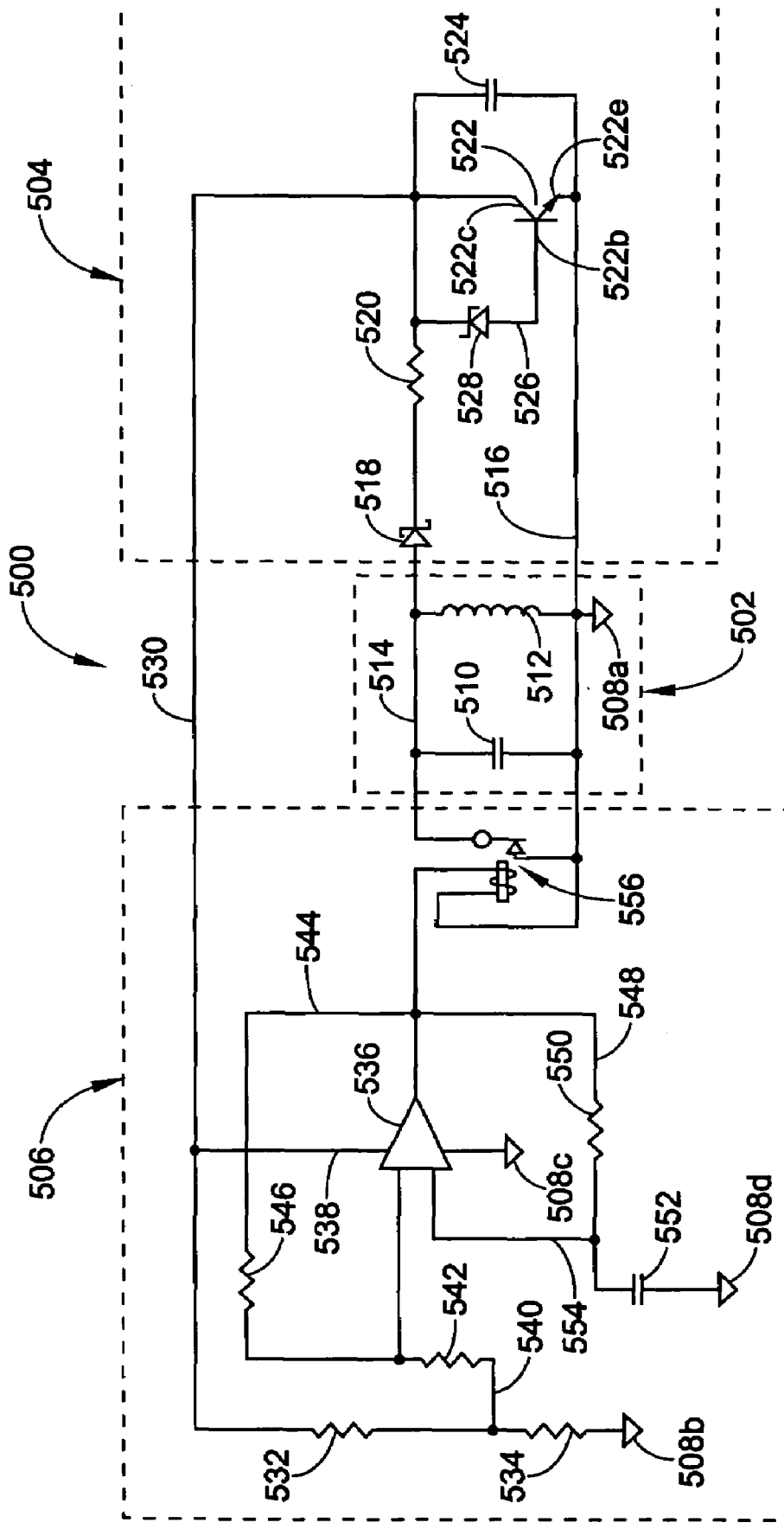
FIG. 5 is a diagram of one embodiment of an electronic circuit operable as the transponder in FIG. 4.

A diagram of one embodiment of a suitable electronic circuit 500 operable as transponder 400 is shown in FIG. 5, and includes an antenna circuit 502, a power circuit 504 and a shunt circuit 506. Generally, antenna circuit 502 corresponds to antenna 402 shown in FIG. 4. Similarly, power circuit 504 corresponds to circuit 404 and shunt circuit 506 corresponds to circuit 406. As discussed above, it will be recognized by the skilled artisan that circuit 500 includes a variety of traditional electrical components, including, without limitation, resistors, capacitors, diodes, operational amps, and inductors. It will be appreciated that these components are of substantially standard construction and are commonly available, unless otherwise noted. Additionally, circuit 500 can be formed as an integrated circuit on a unitary substrate, such as on a silicon wafer, for example, or alternately can be formed from discrete components in any suitable manner of implementation and/or using any suitable circuit fabrication techniques. What's more, various portions of circuit 500 connect to a common ground, and these portions are shown generally by terminal arrow 508.

Antenna circuit 502 includes a capacitor 510 and an inductor 512 connected in parallel between leads 514 and 516, the latter of which is connected to terminal arrow 508a adjacent inductor 512. The inductor is represented in FIG. 5 by a standard symbol. However, it is to be appreciated that tuning or optimizing of the antenna may be desirable to cause the same to be cooperable with inductor 332 of antenna circuit 304, for example. In such case, the inductor can be formed into a specific shape or arrangement, such as a coil of wire that is formed into a square, circular or loop shape, for example.

Power circuit 504 is connected to antenna circuit 502 through leads 514 and 516. A diode 518 and a resistor 520 are connected in series along lead 514. A transistor 522 and a capacitor 524 are connected in parallel between leads 514 and 516. The collector terminal 522c of transistor 522 is connected along lead 514 and the emitter terminal 522e of the transistor is connected along lead 516. A lead 526 connects the base terminal 522b of transistor 522 to lead 514 through a diode 528. In one exemplary embodiment, diode 518 is a Schottky diode and transistor 522 is a standard n-p-n transistor, as are well known by those of skill in the art.

Shunt circuit 506 is connected to power circuit 504 by lead 530, which extends from along lead 514 at about collector terminal 522c. Lead 530 acts as the upper leg of a voltage divider formed by resistors 532 and 534, which are connected between lead 530 and terminal arrow 508b. The shunt circuit also includes an op-amp 536. One SV pin of the op-amp is connected to a lead 530 through lead 538 and the other SV pin is connected to a terminal arrow 508c. A lead 540 connects from between resistors 532 and 534 to the PI pin of op-amp 536 through a resistor 542 connected therebetween. A feedback loop is formed between the TO and PI pins of op-amp 536 by a lead 544, which form the connection through a resistor 546. The TO pin of op-amp 536 is also connected to a terminal arrow 508d by a lead 548, which connects through resistor 550 and capacitor 552. The NI pin of the op-amp is connected to lead 548 from between resistor 550 and capacitor 552 thereon by a lead 554. A relay 556 is shown in FIG. 5 as being connected between the TO pin of op-amp 536 and leads 514 and 516 adjacent capacitor 510, opposite inductor 512. It will be appreciated that any suitable switching-type device can be used as an alternative to relay 556, such as a field-effect transistor (FET), for example.

Transponder antenna 502 is introduced into the transceiver RF field which causes a voltage to be introduced across antenna 502. This voltage passes thru diode 518 to power supply circuit 504, which regulates the voltage on lead 530 for proper operation of shunt circuit 506. Resistors 532 and 534 divide the voltage from lead 530 to be compared to the voltage at the NI pin from along lead 554. Resistor 550 and capacitor 552 control the rate of voltage increase at the NI pin along lead 554. Once the voltage along lead 554 is increased above the voltage at the PI pin taken from between resistors 546 and 542, the output at the TO pin of op-amp 536 will turn on. In turn, this will cause the relay 556 (or another suitable device such as a FET, for example) to short to ground which will short antenna 502. The shorting of the antenna will pull down the voltage at the transceiver to produce a measurable change to get distance.

Figure 6:
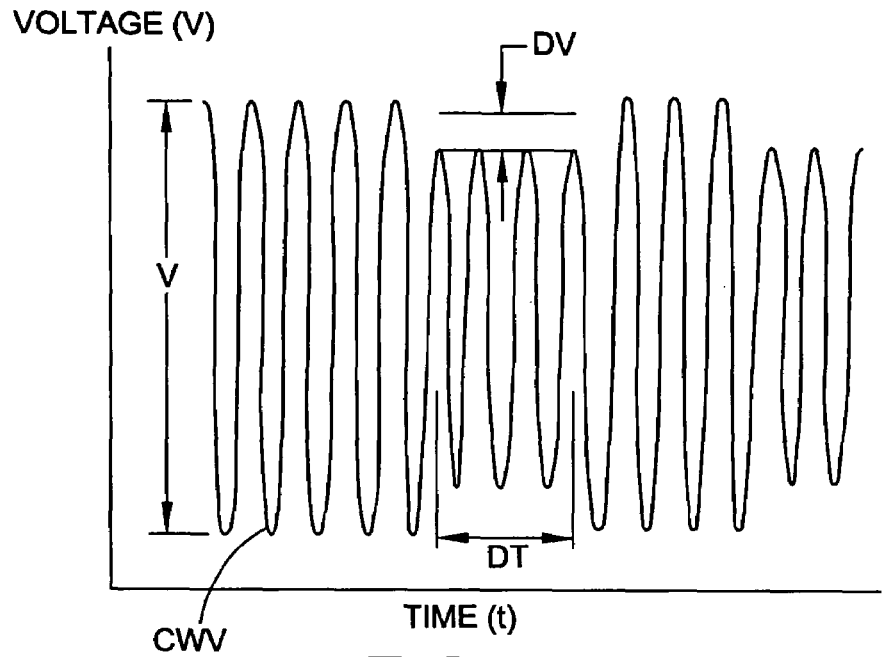
FIG. 6 illustrates an electromagnetic carrier wave having a modulated wave portion.

FIG. 6 illustrates one exemplary form of modulation of an electromagnetic carrier wave CWV having a standard sine waveform and an initial amplitude represented by voltage V. The carrier wave is modulated for an interval DT during which the amplitude thereof is reduced, as indicated by dimension DV. One example of a suitable range for voltage V is from about 50 to about 150 volts. One example of a corresponding range for the amplitude modulation indicated by dimension DV is from about 10 to about 1000 millivolts. The amplitude modulation can occur for any suitable duration or interval DT, such as from about 0.1 to about 5 milliseconds, for example. As indicated above, carrier wave CWV can have any suitable frequency, such as from about 100 kHz to about 14 MHz, for example. Such modulation is commonly referred to as backscattering modulation by those of skill in the art, and is useful for communicating between a transponder and a transceiver.

One example of a well known use of backscattering modulation is found in the area of radio frequency identification (RFID) systems. It will be appreciated, however, that the present novel concept differs significantly from a traditional RFID application. In particular, traditional RFID systems are used to transfer data that is encoded within a disposable tag. The tag associated with an object and typically the data includes one or more details specific to that object. Typically, RFID systems have no interest in determining the distance of the tag from other components of the system. The primary interest these RFID systems is reading the data encoded within the tag.

Figure 7:
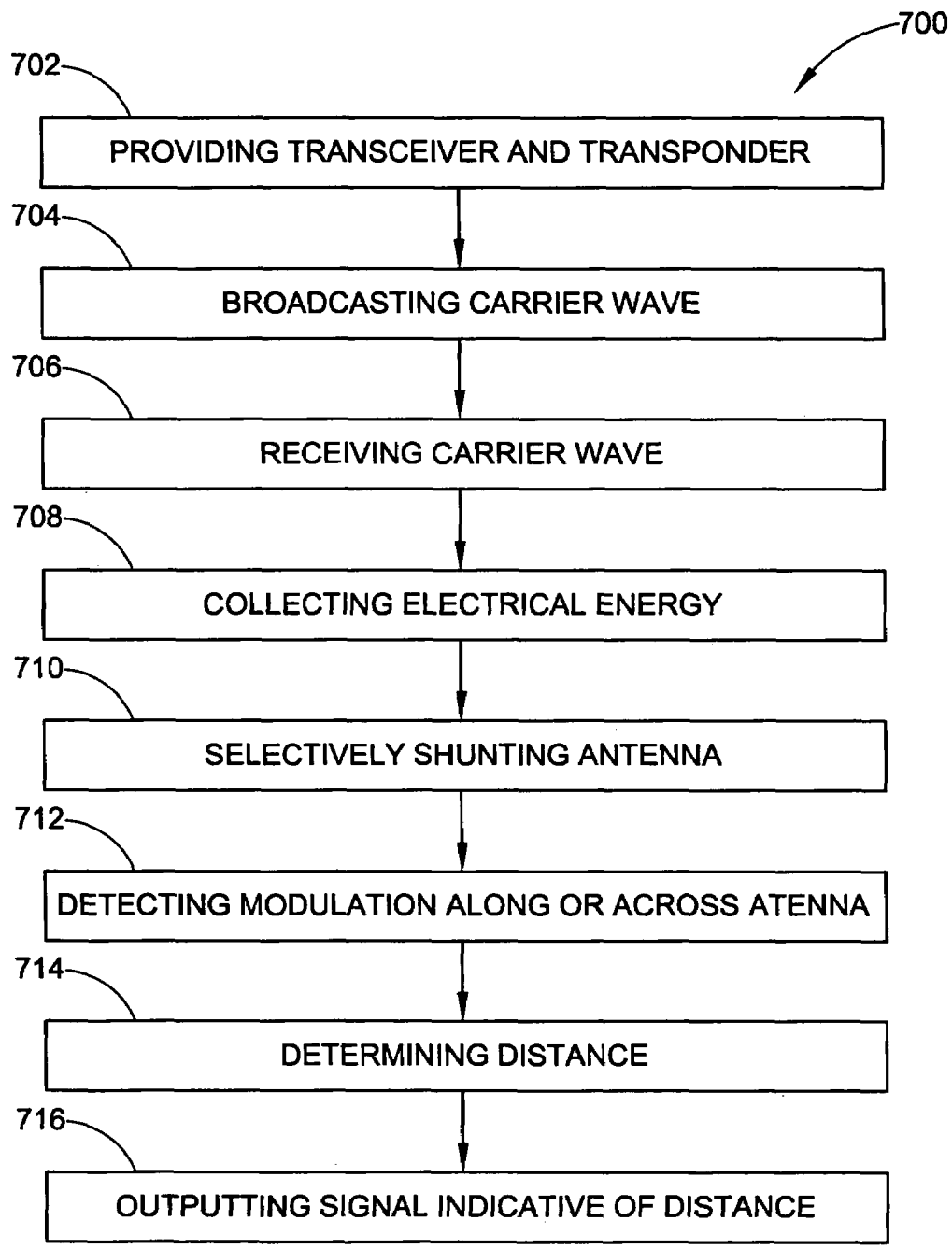
FIG. 7 is a flowchart illustrating steps of one method of indicating a distance in accordance with the present novel concept.

One exemplary method 700 of operation is shown in FIG. 7, and includes a first step 702 of providing a transceiver and a transponder, such as transceiver 100 or 200 and transponder 400, for example, in spaced relation to one another. Another step 704 includes broadcasting an electromagnetic carrier wave, such as carrier wave CWV, for example, from the antenna of the transceiver toward the antenna of the transponder. Another step 706 includes receiving the carrier wave at or along the antenna of the transponder. It is well understood by skilled artisans that electrical energy is generated along and/or across an inductor due to the reception and influence of an electromagnetic wave. Here, an optional step 708 includes collecting electrical energy generated along and/or across the antenna of the transponder due to the reception of the electromagnetic carrier wave. Another step 710 includes selectively shunting the antenna of the transponder and thereby causing the antenna of the transceiver to experience a modulation of one or more of its electrical properties, such as a momentary voltage drop, for example. A further step 712 includes detecting a modulation of an electrical property along or across the antenna. Another step 714 includes determining a distance between the transceiver and the transponder based at least in part upon the modulation of the electrical property in step 712. Still another step 716 includes outputting a signal indicative of the distance determined in step 714.

Figure 8:
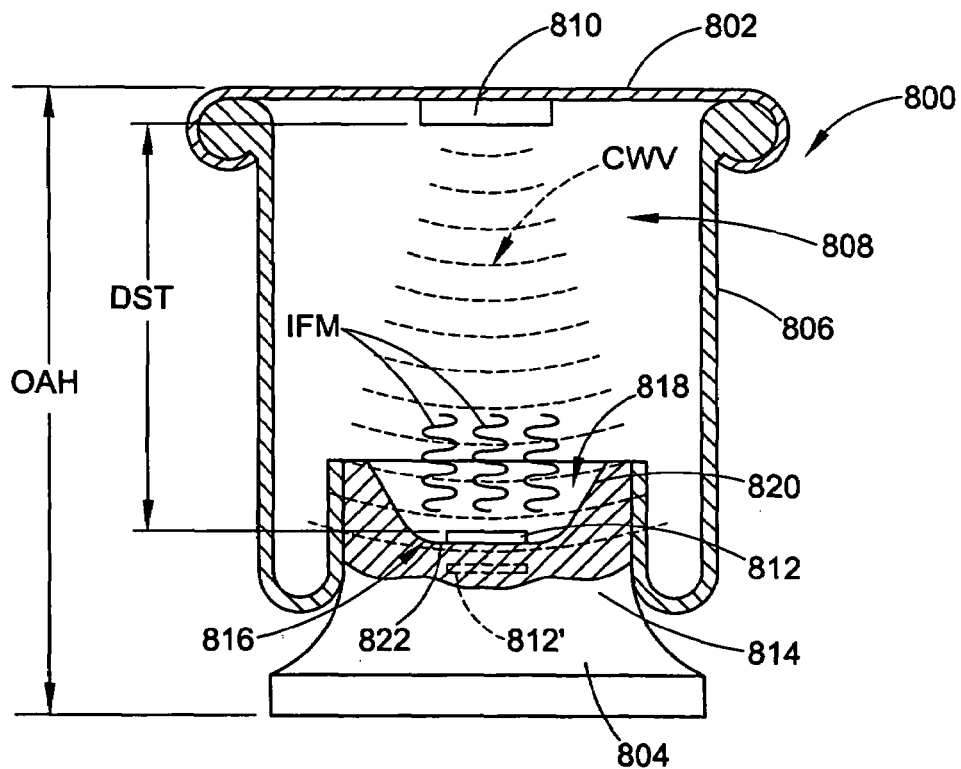
FIG. 8 is a side view, in partial cross section, of a fluid suspension member with a height indicating system in accordance with the present novel concept supported thereon.

One example of an application utilizing the present novel concept on and in association with a fluid suspension member 800 is shown in FIG. 8. The fluid suspension member is, more specifically, shown as being an air spring having a traditional piston and rolling lobe construction. It is to be distinctly understood, however, that a fluid suspension member of any suitable type, style, kind and/or configuration can be used without departing from the present novel concept. Fluid suspension member 800 includes a first end member, such as a top plate 802, for example, a second end member, such as a piston 804, for example, in spaced relation to the first end member, and a flexible member, such as flexible sleeve 806, for example, supported therebetween to substantially define an inner volume, such as fluid chamber 808, for example.

A transceiver 810 is supported on top plate 802 within fluid chamber 808 and a transponder 812 is supported on piston 804 in spaced relation to the transceiver. Piston 804 includes an outer peripheral wall 814 along which flexible sleeve 806 is displaced and a central inner wall 816. The inner wall is shown in FIG. 8 as being substantially concave or dish-shaped and forms an inner recess 818. Inner wall 816 has a side wall portion 820 and a bottom wall portion 822 upon which transponder 812 is secured. Transponder 812 can be secured on inner wall 816 in any suitable manner, such as by adhesive or using a mechanical fastener, for example. Alternately, transponder 812 can be molded or otherwise formed into inner wall 816 as indicated by transponder 812'. It will be appreciated that transceiver 810 is generally representative of any suitable transceiver, such as any of the various transceivers disclosed herein, including without limitation transceivers 100 and 200, for example. Similarly, transponder 812 is generally representative of any suitable transponder, such as the various transponders disclosed herein, including without limitation transponder 400, for example.

Once electromagnetic carrier wave CWV is broadcast and received by transponder 812, electrical energy generated along and/or across an antenna, such as in antenna circuit 402 of transponder 400, for example, acts to at least periodically power the transponder, such as has been described with regard to power circuit 404, for example. Alternately, the electrical energy could be provided by a battery or other suitable power source. Once transponder 812 is energized, a shunt circuit, such shunt circuit 406 of transponder 400, for example, periodically shunts the antenna of transponder 812 which causes the antenna of transceiver 810, such as in antenna 104 or 204, for example, to experience a modulation. The interrelationship between the antennae of the transponder and transceiver has been discussed above and is, for illustrative purposes only, generally represented by sine waves IFM in FIG. 8. One or more characteristics or properties of the modulation will directly correspond or otherwise be mathematically related to the distance between the transponder and the transceiver as is well understood by those of skill in the art. As such, the transceiver detects the modulation and outputs a signal indicative of the distance between the transceiver and the transponder. It will be fully understood, however, that modes of operation other than that described in the foregoing can be used without departing from the present novel concept.

Figure 9:
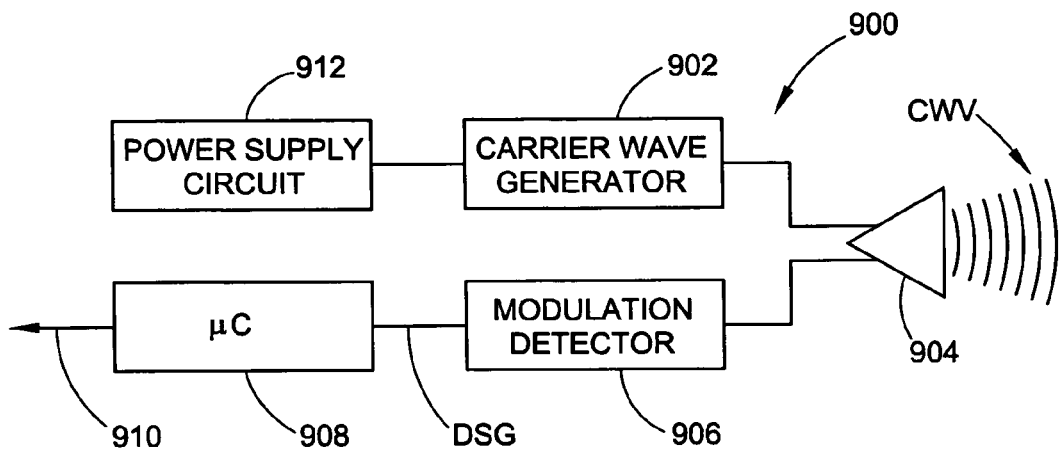
FIG. 9 schematically illustrates another alternate embodiment of a transceiver in accordance with the present novel concept.

Another alternate embodiment of a transceiver 900 is schematically shown in FIG. 9. Transceiver 900 includes a carrier wave generator 902 that is in electrical communication with an antenna 904. Like wave generators 102 and 202 discussed above, wave generator 902 is adapted to output an electrical carrier wave signal to the antenna which in turn broadcasts a corresponding carrier wave CWV. A modulation detector 906 is electrically connected to antenna 904 generally opposite wave generator 902. Modulation detector 906 is similar to detectors 106 and 206 discussed above in that detector 906 is adapted to detect a modulation of an electrical characteristic or property along or across the antenna. Modulation detector 906 differs from detectors 106 and 206, however, in that detector 906 is adapted to output a digital signal DSG corresponding to the modulation along or across antenna circuit 904, rather than outputting an analog signal having a property, such as a voltage or current level, in corresponding relation to the magnitude of the modulation as in detectors 106 and 206. Digital signal DSG is communicated to a suitable digital device, such as a digital signal processor or a microcontroller 908, for example, which is operable to convert, decode and/or analyze digital signal DSG and output a corresponding signal indicative of a distance between the transceiver and an associated transponder. The signal output by microcontroller 908 is communicated to a downstream system or device, as indicated by arrow 910.

Additionally, a power supply circuit 912 is shown in FIG. 9 in electrical communication with wave generator 902. It will be appreciated that in other embodiments, power supply circuit 912 can also or alternately provide electrical power to one or more of the other components of transceiver 900. As discussed above with regard to power supply circuit 112 of transceiver 100 in FIG. 1, for example, circuit 912 can take any suitable form, shape or configuration either integral with or separate from the other components of transceiver 900. One example of a suitable transceiver is available from Microchip Technologies, Inc. of Chandler, Ariz. under the designation or item number MCRF 200.

Figure 10:
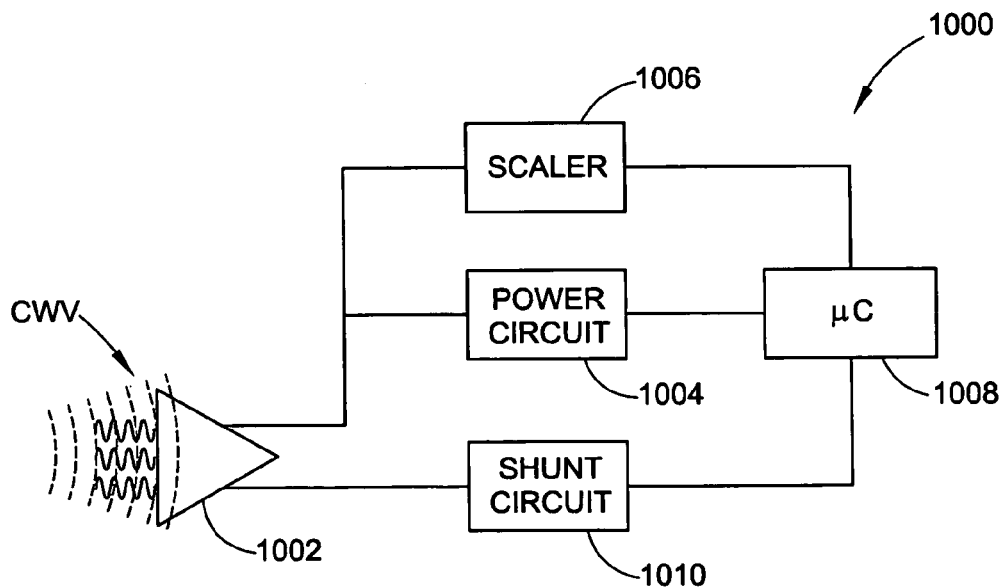
FIG. 10 schematically illustrates an alternate embodiment of a transponder in accordance with the present novel concept.

One example of a transponder suitable for use in association with transceiver 900 is shown in FIG. 10 as transponder 1000. In general, transponder 1000 operates in combination with a transceiver, such as transceiver 900, to determine a distance therebetween and output a signal indicative of this distance, as has been described in detail above. In the foregoing embodiments, however, the transceiver, such as transceiver 100 or 200, determines the distance between the two components based upon the magnitude of modulation along or across the antenna thereof. The primary operation of the associated transponder, such as transponder 400, is to effectuate or cause this modulation. Here, the operation of transceiver 900 and transponder 1000 is based upon the present novel concept and utilizes the same underlying principles of operation discussed above with regard to the other embodiments. However, transponder 1000 is operable to at least partially determine the distance between the two components, such as by using a digital processing device, for example. Accordingly, digital data corresponding to the distance and/or other data, such as an identification code or number, for example, will be communicated at least from the transponder to the transceiver. Such a data transmission, communication and/or exchange can take any suitable form, including without limitation direct data transmissions and encoded data transmissions, as will be discussed hereinafter.

It will be appreciated from FIGS. 10-14 that this construction is different than the foregoing embodiments in structure and operation, as will be discussed in detail hereinafter. Transponder 1000 includes an antenna 1002 adapted to receive electromagnetic carrier wave CWV, such as may be broadcast by antenna 904 of transceiver 900, for example. As described in detail above, carrier wave CWV induces an electrical energy output along and/or across antenna 1002. The electrical energy output is communicated to a power circuit 1004 and a scaler 1006, which are in electrical communication with the antenna. Generally, the power circuit collects at least a portion of the electrical energy and periodically energizes one or more components of the transponder, as has been described above.

Scaler 1006 is operative to reduce or otherwise scale down one or more electrical characteristics or properties, such as a voltage or current level, for example, of the signal from antenna 1002 that is passing therethrough. Scaler 1006 will preferably condition the signal from antenna 1002 for receipt and usage by a digital signal processor or microcontroller 1008, which is in electrical communication with the scaler and power circuit. Preferably, however, this reduction or scaling down of the electrical signal is performed such that a relationship of the scaled-down signal is maintained with respect to the original signal from the antenna. In this way, microcontroller 1008 can be used to determine a distance between the associated transceiver, such as transceiver 900, for example, and transponder 1000. As mentioned above, it is understood by those of skill in the art that one or more properties of electromagnetic waves vary with distance of travel according to well known relationships therebetween.

As indicated above, power circuit 1004 periodically energizes one or more circuits or components of the transponder. One such component energized by the power circuit is microcontroller 1008, which determines a magnitude or other electrical characteristic or property of the signal output by scaler 1006. This magnitude or other property will have a direct or other mathematical relation to the distance between that transceiver and the transponder. Thus, the microcontroller can determine the actual distance value and then operate to communicate the same back to the transceiver. Alternately, the microcontroller can simply operate to communicate the magnitude or other property of the signal output by the scaler without specifically determining an actual distance value. In this alternate example, once the signal from the scaler has been communicated back to the transceiver, the microcontroller therein can convert or calculate the actual distance value.

Once microcontroller 1008 is energized and has determined a characteristic or property of the signal output by scaler 1006, the microcontroller operates to selectively activate shunt circuit 1010 to communicate data, preferably including without limitation data corresponding to the distance value or the signal output by the scaler, back to the associated transceiver. When activated, shunt circuit 1010 electrically shorts antenna 1002 which, in turn, induces a modulation across or along the antenna of the corresponding transceiver, such as antenna 904 of transceiver 900, for example. The interrelationship between the antennae of the transceiver and transponder has been discussed above in significant detail, and is generally indicated by sine waves IFM in FIG. 10.

Figure 11:
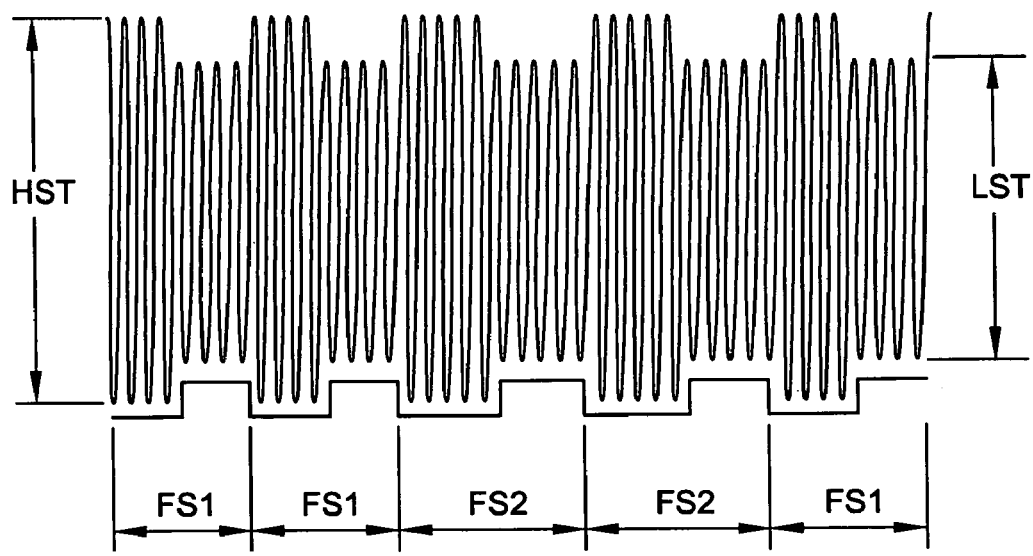
FIG. 11 illustrates an electromagnetic carrier wave modulated using frequency-shift keying.
Figure 12:
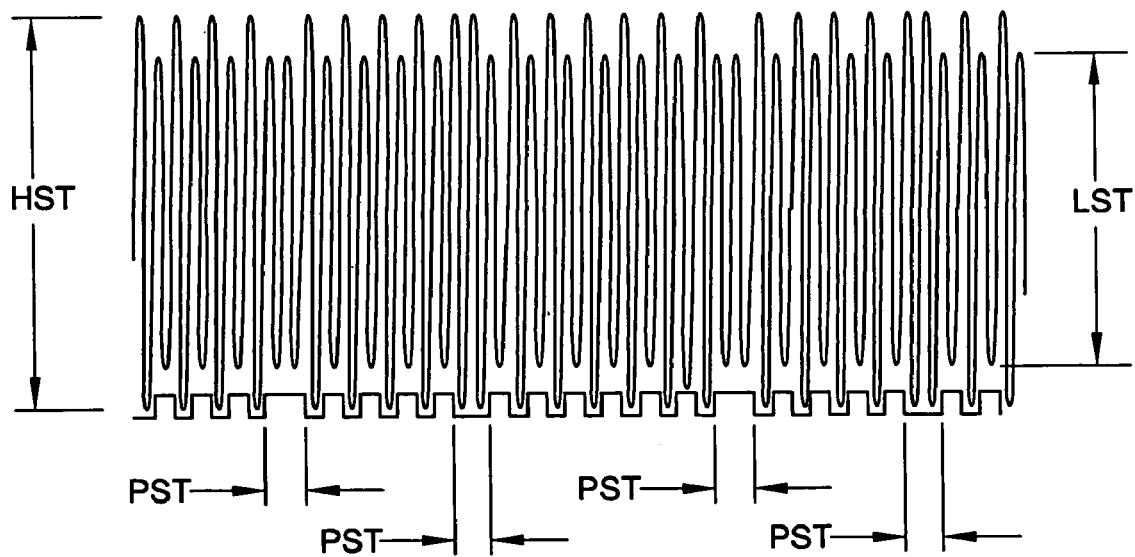
FIG. 12 illustrates an electromagnetic carrier wave modulated using phase-shift keying.

In one exemplary embodiment, either the signal value or the actual distance value is communicated as data from the transponder back to the transceiver by the operation of microcontroller 1008 selectively actuating shunt circuit 1010. The data communication from the transponder to the transceiver can be of any suitable form or type, such as a binary data stream directly corresponding to either the signal or distance values. Alternately, the digital communication can be encoded to minimize losses due to interference, for example. A wide variety of encoding arrangements are known and can be used, such as those using frequency-shift keying (FSK) and phase-shift keying (PSK), for example. Both FSK and PSK are well known by those of skill in the art. An example of a carrier wave CWV modulated using FSK is shown in FIG. 11, and includes wave CWV modulated between a high amplitude state HST and a low amplitude state LST. The modulation can act to transmit data in any suitable manner, such as by having an 8-cycle shift FS1 correspond to a zero (0) value and a 10-cycle shift FS2 correspond to a one (1) value, for example. In this way, a binary data stream can be transmitted between the transponder and the transceiver. An example of a carrier wave CWV modulated using PSK is shown in FIG. 12 and also includes carrier wave CWV being modulated between states HST and LST. As is apparent from FIG. 12, the frequency with which the carrier wave is shifted remains constant, such as at one cycle at HST, the next cycle at LST, the next cycle after that at HST, etc. To transmit data, however, the phase can be shifted such that two cycles occur at the same state. In one example, each phase shift PST represents a zero (0) in the binary data stream. In another example, each shift PST represents a data value changes (from 0 to 1 or from 1 to 0). It will be understood, however, that any other suitable modulation and/or data transmission technique can alternately be used.

Figure 13:
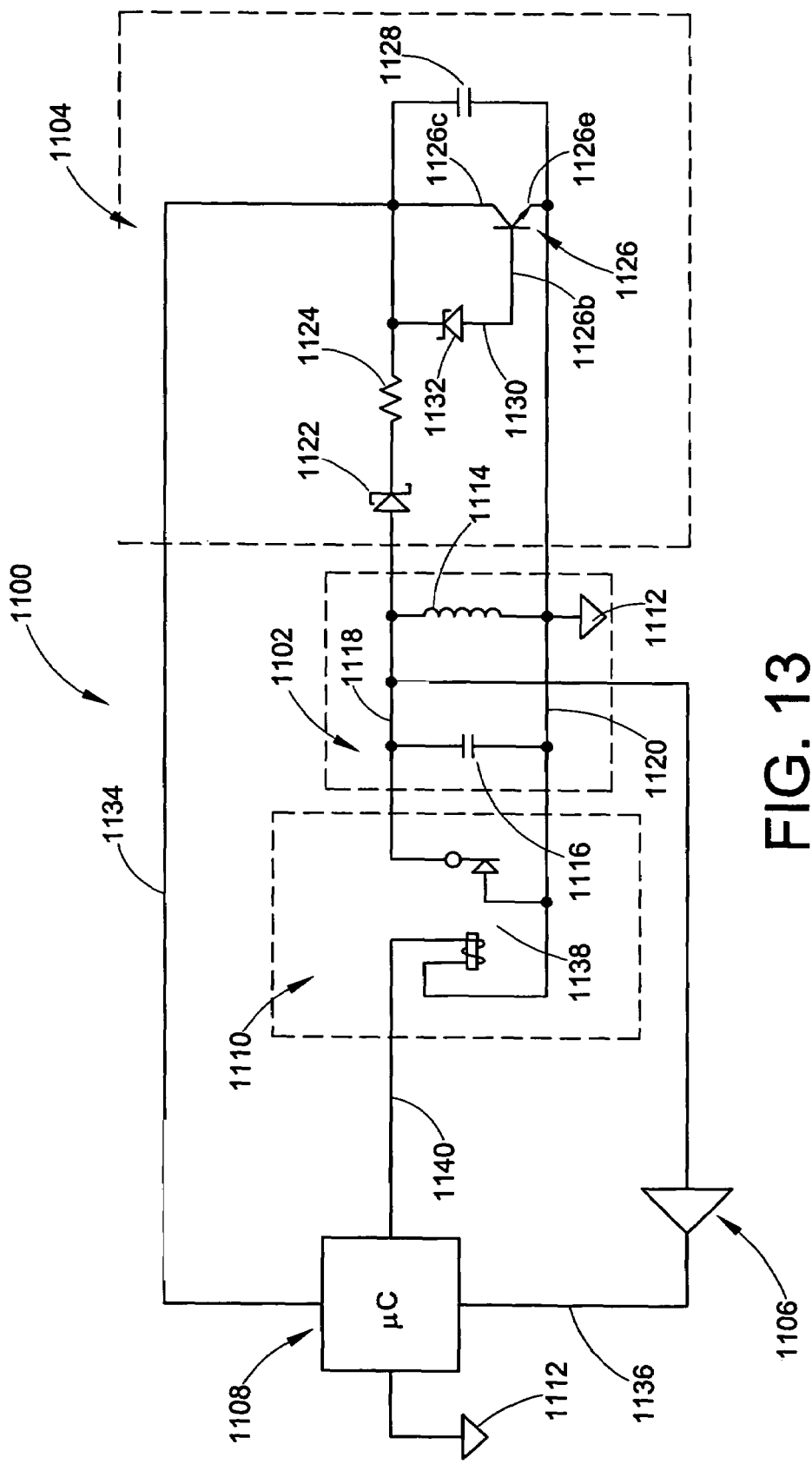
FIG. 13 schematically illustrates one embodiment of an electronic circuit operable as the transponder in FIG. 10.

A diagram of one embodiment of a circuit 1100 that is suitable for use as a transponder 1000 is shown in FIG. 13. The circuit includes an antenna circuit 1102, a power circuit 1104, a scaler 1106, a microcontroller 1108 and a shunt circuit 1110. Generally, antenna circuit 1102 corresponds to antenna 1002 shown in FIG. 10. Similarly, power circuit 1104 corresponds to circuit 1004, scaler 1106 corresponds to scaler 1006, microcontroller 1108 corresponds to microcontroller 1008 and shunt circuit 1110 corresponds to shunt circuit 1010.

As discussed above, it will be recognized by the skilled artisan that circuit 1100 includes a variety of traditional electrical components, including, without limitation, resistors, capacitors, diodes, inductors, transistors and other well known components. It will be appreciated that these components are of substantially standard construction and are commonly available, unless otherwise noted. Additionally, circuit 1100 can be formed as an integrated circuit on a unitary substrate, such as on a silicon wafer, for example, or alternately can be formed from discrete components in any suitable manner of implementation and/or using any suitable circuit fabrication techniques. What's more, various portions of circuit 1100 connect to a common ground, and these portions are shown generally by terminal arrow 1112.

Antenna circuit 1102 includes an inductor 1114 and a capacitor 1116 connected in parallel between leads 1118 and 1120. Terminal arrow 1112 is connected along lead 1120 adjacent the inductor, which is represented in FIG. 13 by a standard symbol. However, it will be appreciated that tuning or optimizing of the antenna may be desirable to cause the same to be cooperable with another antenna, such as antenna 904 of transceiver 900, for example. In such case, inductor 1114 can be formed into a specific shape or arrangement, such as a coil of wire that is formed into a square, circular or loop shape, for example.

Power circuit 1104 is connected to antenna circuit 1102 through leads 1118 and 1120. A diode 1122 and a resistor 1124 are connected in series along lead 1118. A transistor 1126 and a capacitor 1128 are connected in parallel between leads 1118 and 1120. The collector terminal 1126c of transistor 1126 is connected along lead 1118 and the emitter terminal 1126e of the transistor is connected along lead 1120. A lead 1130 connects the base terminal 1126b of transistor 1126 to lead 1118 through a diode 1132. In one exemplary embodiment, diode 1122 is a Schottky diode and transistor 1126 is a standard n-p-n transistor, as are well known by those of skill in the art.

Microcontroller 1108 is connected to power circuit 1104 through lead 1134 that connects with lead 1118 from between resistor 1124 and capacitor 1128 adjacent collector terminal 1126c. Additionally, microcontroller 1108 is in electrical connection with lead 1120 by lead 1136 through scaler 1106. Microcontroller 1108 can be of any suitable type or configuration. One example of a suitable microcontroller is available from Freescale Semiconductor, Inc. of Austin, Tex. under the designation or part number 68HC05L25. This microcontroller includes a processor, a memory and a clock. Additionally, scaler 1106 can take any suitable form or configuration.

Shunt circuit 1110 includes a relay 1138 connected between leads 1118 and 1120 of antenna circuit 1102 and lead 1140, which is in electrical communication with microcontroller 1108. It will be appreciated that any suitable switching-type device can be used as an alternative to relay 1138, such as a field-effect transistor (FET), for example.

Figure 14:
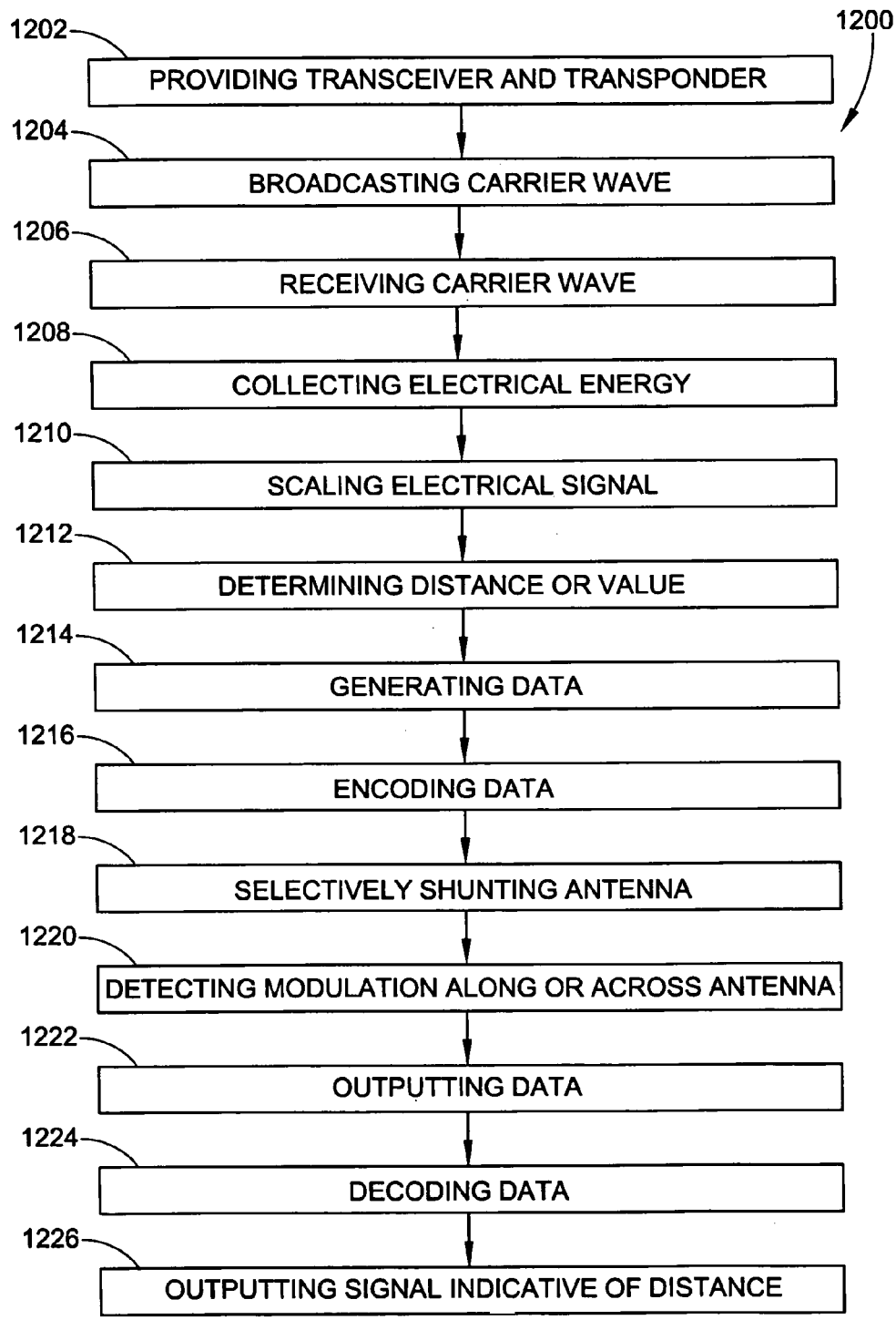
FIG. 14 is a flow chart illustrating steps of another method of indicating a distance in accordance with the present novel concept.

Another exemplary embodiment of a method 1200 of operation is shown in FIG. 14 and includes a step 1202 of providing a transceiver and a transponder, such as transceiver 900 and transponder 1000, for example, in spaced relation to one another. Another step 1204 includes broadcasting an electromagnetic carrier wave from an antenna of the transceiver toward the antenna of the transponder. Another step 1206 includes receiving the carrier wave at or along the antenna of the transponder. An optional step 1208 includes collecting electrical energy generated along and/or across the antenna of the transponder.

Another step 1210 of method 1200 includes scaling the electrical signal from the antenna of the transponder to a magnitude suitable for use by a processor or microcontroller. Still another step 1212 includes determining one of a distance and a value corresponding to the distance based upon the scaled electrical signal output. A further step 1214 includes generating data corresponding to one of the distance and the value corresponding to the distance. An optional step 1216 includes encoding the generated data. Still a further step 1218 includes selectively shunting the antenna of the transponder to modulate the antenna of the transceiver to communicate the data. Another step 1220 includes detecting the modulation of the antenna of the transceiver. Still another step 1222 includes outputting data corresponding to the detected modulation. A further optional step 1224 includes decoding the data in a manner cooperative with optional encoding step 1216. Still a further step 1226 includes outputting data or other digital signal indicative of the distance.

While the invention has been described with reference to the foregoing embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as the same come within the scope of the appended claims and the equivalents thereof

The invention claimed is:

1. A distance indicating system for an associated air spring used on an associated vehicle, the associated air spring including first and second support members secured together by an elastomeric wall such that the support members move relative to one another in response to a load applied to the associated air spring, said distance indicating system comprising:
   a transceiver including a first antenna and operative to broadcast an electromagnetic wave using said first antenna; and,
   a transponder spaced a distance from said transceiver and within the broadcasting range of said electromagnetic wave, said transponder including a second antenna adapted to receive said electromagnetic wave, and said transponder operative to shunt said second antenna for a predetermined period, the shunted said second antenna inducing an amplitude variation of said electromagnetic wave broadcasted by said transceiver, said amplitude variation increasing as the distance from said first antenna to said second antenna decreases; and
   one of said transceiver and said transponder supported on one of said first and second support members,
   wherein said distance indicating system detects and measures the amplitude variation of said broadcasted electromagnetic wave, correlates specific amplitude variations with respective distances from said transceiver first antenna to said transponder second antenna, and generates a signal representative of the respective distances.

2. A distance indicating system according to claim 1, wherein said amplitude variation of said electromagnetic wave includes inducing one of a voltage variation and a current variation across said first antenna of said transceiver resulting in a correspondingly modulated electromagnetic wave.

3. A distance indicating system according to claim 1, wherein said transceiver and said transponder are magnetically inductively coupled respectively through said first and second antennae.

4. A distance indicating system according to claim 3, wherein said transponder includes a power circuit adapted to accumulate electrical energy from said transceiver through said inductive coupling and periodically discharge said electrical potential energy to power said transponder.

5. A distance indicating system according to claim 1, wherein said transponder includes a power circuit and a shunt circuit operatively connected to said second antenna.

6. A distance indicating system according to claim 5, wherein said transceiver includes a carrier wave generating circuit and a modulation detecting circuit operatively connected to said first antenna.

7. A distance indicating system according to claim 1, wherein said amplitude variation is a voltage amplitude variation across said first antenna.

8. A distance indicating system according to claim 1, wherein said transceiver includes a modulation detector that is adapted to detect said amplitude variation and output a distance signal corresponding to said distance.

9. A distance indicating system according to claim 8, wherein said distance signal is an analog distance signal and said transceiver includes an analog-to-digital converter adapted to generate a corresponding digital distance signal.

10. An air spring assembly comprising:
an upper end member;
a lower end member in spaced relation to said upper end member;
a flexible spring member supported between said upper and lower end members; and
a distance indicating system comprising:
a transceiver supported on one of said upper end member and said lower end member, said transceiver including a first antenna and adapted to broadcast an electromagnetic wave using said first antenna; and,
a transponder supported on the other of said upper end member and said lower end member, said transponder including a second antenna operative to shunt said second antenna for a predetermined period, the shunted said second antenna inducing an amplitude variation of said electromagnetic wave, said amplitude variation increasing as the distance from said first antenna to said second antenna decreases,
wherein said distance indicating system detects and measures said amplitude variation of said broadcasted electromagnetic wave, correlates specific amplitude variations with respective distances from said transceiver first antenna to said transponder second antenna, and generates a signal representative of said respective distances.

11. An air spring assembly according to claim 10, wherein said electromagnetic wave is broadcast from said first antenna at a first wave amplitude and said transponder is operable to induce a variation in voltage across said first antenna that results in the broadcast of said electromagnetic wave at a second wave amplitude.

12. An air spring assembly according to claim 10, wherein said transceiver and said transponder are magnetically inductively coupled respectively through said first and second antennae.

13. An air spring assembly according to claim 10, wherein said transponder includes a power circuit operatively connected to said second antenna and a shunt circuit operatively connected to one of said power circuit and said second antenna.

14. An air spring assembly according to claim 10, wherein a voltage from about 50 to about 150 volts is applied across said first antenna and said amplitude variation of said electromagnetic wave is from about 10 to about 1000 millivolts.

15. An air spring assembly according to claim 10, wherein said transceiver includes an amplitude variation detector operative to output a distance signal indicative of said distance between said transceiver and said transponder.

16. A method of determining a distance between first and second structural members interconnected by a flexible spring of an air suspension assembly, said method comprising steps of:
a) providing a transceiver supported on said first structural member and including a first antenna;
b) providing a transponder supported in spaced relation to said transceiver, said transponder including a second antenna;
c) broadcasting an electromagnetic wave using said first antenna and thereby inductively coupling said transceiver and said transponder through said first and second antennae;
d) shunting said second antenna for a predetermined period, the shunted said second antenna inducing an amplitude variation of said electromagnetic wave broadcasted by the transceiver, said amplitude variation increasing as the distance from said first antenna to said second antenna decreases;
e) detecting said amplitude variation of the said broadcasted electromagnetic wave; and,
f) determining said distance between said transceiver and said transponder based at least in part on said detected amplitude variation.

17. A method according to claim 16, wherein providing said transponder in b) includes providing a transponder that includes a power circuit and a shunt circuit each operatively connected to said second antenna, and d) includes selectively shunting said shunt circuit using electrical energy from said power circuit.

18. A method according to claim 16 further comprising outputting a distance signal corresponding to said distance determined in f).

* * * * *